A. PURSER.
VALVE OR COCK.
APPLICATION FILED FEB. 14, 1912.

1,119,191.

Patented Dec. 1, 1914.

Alexander Purser,
Inventor.

Witnesses.

UNITED STATES PATENT OFFICE.

ALEXANDER PURSER, OF DRIEFONTEIN, TRANSVAAL, SOUTH AFRICA.

VALVE OR COCK.

1,119,191.  Specification of Letters Patent.  Patented Dec. 1, 1914.

Application filed February 14, 1912. Serial No. 677,436.

*To all whom it may concern:*

Be it known that I, ALEXANDER PURSER, a subject of Great Britain, residing at Driefontein, Transvaal, Province of the Union of South Africa, have invented a new and useful Valve or Cock, of which the following is a specification.

My invention relates to improvements in valves or cocks for compressed air, steam or other fluid, the object being to provide a valve which will so control the fluid that only a restricted quantity can pass through, unless there is some resistance or certain increase of pressure upon the discharge side of the valve, thus preventing or lessening trouble as regards bursting of pipes, the valve being specially intended to prevent the compressed air, used in mines as the motive power for driving rock drills or other pneumatic tools from blowing away too freely when not connected with the machines.

The invention consists in a compound valve comprising a main valve and an auxiliary valve adapted automatically to control the flow of fluid through the main valve, the automatic control being dependent upon the fluid pressure.

Further particulars of the invention will be herein more particularly described and defined in the claims.

Figure 1:
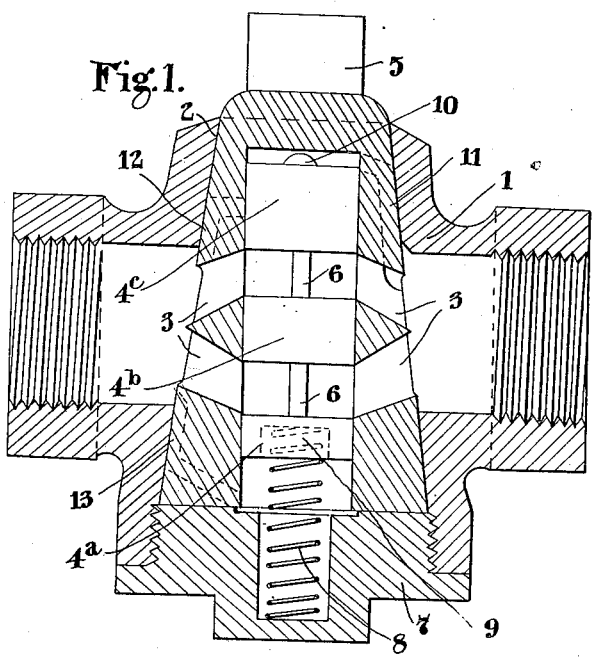
Figure 2:
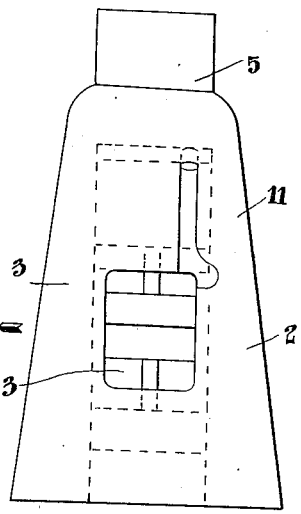
Figure 3:
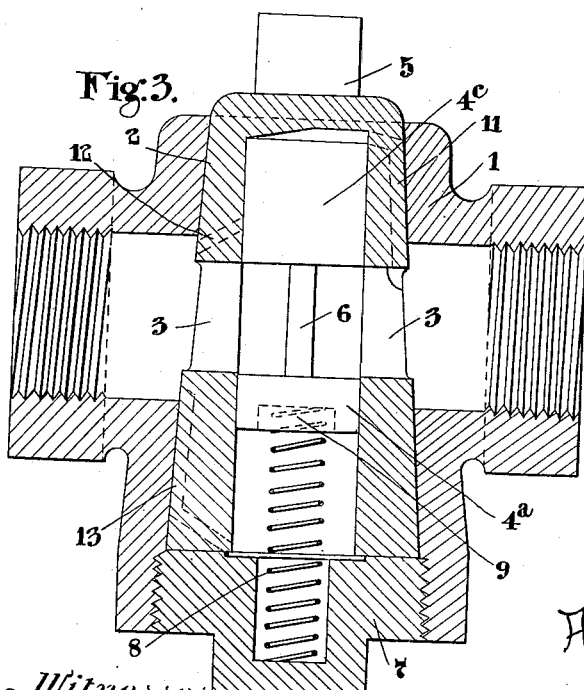
Figure 4:
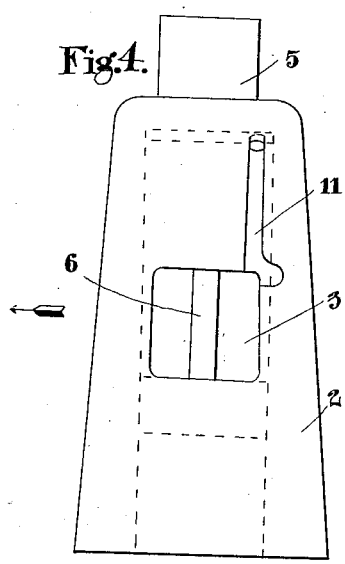

Figure 1 is a sectional elevation of one form of compound valve according to the invention. Fig. 2 is an outside elevation of the cone member of the valve shown in Fig. 1, viewed from the direction of the flow of the fluid. Fig. 3 is a sectional elevation of another form of valve. Fig. 4 being an outside elevation of the cone member of the valve shown in Fig. 3.

In constructing a compound valve according to one convenient mode of carrying out the invention as applied for use in connection with the employment of pneumatic tools in mines in each of the two modifications illustrated in Figs. 1 and 3, the main valve consists of a valve casting or shell 1 in which a plug 2 (which may be cylindrical or conical in formation) fits, having an aperture or apertures 3 adapted to communicate with the ports in the valve casting or shell, and the auxiliary valve consists of a spool or piston or set of pistons $4^{abc}$ (Fig. 1) $4^{ac}$ (Fig. 3) carried in a central chamber of the plug 2.

Describing the main and auxiliary valve as illustrated in Fig. 1, the conical plug 2 is provided at its upper end with a portion 5, adapted to receive a tool or handle whereby the plug may be rotated in its seat. The central chamber of the plug is cylindrical in shape formed preferably by boring. The plug 2 is retained in position by a screwed cap 7, having in it a recess or socket in which is mounted the spring 8. The spool $4^{abc}$ comprises three pistons mounted on or formed with a rod or stem 6, the piston $4^a$ being provided with a recess 9 into which one end of the spring 8 beds. The other pistons $4^b$ and $4^c$ are formed of such proportions that when the spool moves downwardly against the action of the spring 8 they close the ports 3, and prevent any fluid passing through the valve by way of the said ports 3.

The end piston $4^c$ is preferably provided with some projection or stop 10 in order that when it is forced back it does not entirely fill up the end of the central chamber, but leaves a small space therein.

In cases it may be found desirable that the fluid should not entirely be cut off. Under such circumstance the pistons would be such as to fail to cover wholly the orifices or ports 3 when a small amount of the fluid would be allowed to pass through the main valve. Also instead of providing the valve with three pistons two may be provided, as will be more particularly described in connection with Fig. 3.

The plug 2 is provided at its upper end with two ducts 11 and 12, which form a by-pass for the fluid to the rear of the piston $4^c$, when the auxiliary valve is in position to close the ports 3. A similar duct 13 is formed upon the discharge side of the valve communicating with the rear of the piston $4^a$.

In the form shown in Fig. 3 the spool or piston member consists of two pistons $4^a$ and $4^c$ connected by a stem 6, the lower piston $4^a$ being smaller than the upper piston $4^c$, and being provided with a recess for the reception of the spring 8 as in the previous modification.

The single port or aperture 3 is controlled by piston $4^c$ under the influence of pressure passing by way of the duct 11. When the spool is in its extreme lower position the duct 12 is uncovered so that the fluid from what may be called the "retaining" side of the valve may flow to the discharge side of the valve by way of the ducts 11, 12. As in the previous case another duct 13 is provided so the fluid may act upon the rear of the piston 4ª.

The position of the duct 11 with relation to the port 3 may be clearly seen from the Fig. 4. It is preferable to locate it in this position so that the by-pass is put in communication with the "retaining" side of the fluid conduit at an early stage in the operation of the opening of the main valve.

Describing now the operation of the device with reference to Fig. 3 as typical of the mode of working of the invention, let it be assumed that the valve is connected upon either side to a conduit through which compressed air is to pass from a pumping engine or reservoir to the pneumatic tools in a mine, the direction of the flow being indicated by arrows. The operator would fit his key to the end of 5 of the plug and throw open the main valve to its full extent. The compressed air would tend to rush through the ports 3, but would immediately be cut off by the piston 4ᶜ, which would have moved downward against the pressure of the spring 8 forced by the pressure of the compressed air passing through the duct 11 and acting upon the end of the piston 4ᶜ. It will be seen that this action takes place owing to the fact that the fluid pressure will be acting upon the upper surface of the piston 4ᶜ against the action of the spring 8, the restraining action of which will be overcome. The fluid pressure acting upon the under side of the piston 4ᶜ will be balanced by that acting upon the upper side of the piston 4ª.

This explanation will be seen to apply *mutatis mutandis* in the case of the modification shown in Fig. 1. The spool having closed the ports 3, or, when desirable, having nearly closed them the compressed air will leak through the by-pass 11, 12, and will gradually raise the pressure in the conduit on the discharge side of the valve, assuming that there is some resistance, as when the conduit is attached to a tool or is discharging into some receptacle, and when such pressure rises approximately to that of the air on the retaining side of the valve it will be understood that the spool moves back into its original position by reason of the action of the compressed air passing through the duct 13 to the rear side of the piston 4ª aided by the spring 8. In this way the sudden turning of the main valve does not cause a sudden increase of pressure in the conduit upon the discharge side of the valve, and thus any trouble with regard to bursting and the like is avoided. It will also be seen that in this way wastage of air is prevented, as, while the pressure on the discharge side of the valve is low, the spool will keep the main valve closed and the air will only be allowed to leak through the by-pass. This is found convenient when the conduit is detached from the tool or tools or when used to ventilate the working place of the mine.

Having now described my invention, what I claim as new and desire to secure by Letters Patent is:—

1. A compound valve having in combination, a main valve consisting of a plug having a longitudinal recess and provided with a transverse passage adapted to communicate with the fluid conduit, and walls having ducts therein, and an auxiliary valve for controlling said transverse passage, comprising a stem and two pistons, the latter being adapted to fit said recess and work therein and form two chambers at the ends thereof, one of said ducts connecting the inlet side of the valve to one of said chambers, a second of said ducts connecting said chamber with the outlet side of valve, and being adapted to be closed by the auxiliary valve when said valve is in the open position, a third of said ducts connecting the outlet side of valve with the other of said chambers.

2. A compound valve having in combination a main valve consisting of a plug having a longitudinal recess and provided with a transverse passage adapted to communicate with the fluid conduit, and walls having ducts therein, and an auxiliary valve for controlling said transverse passage comprising a stem and two pistons, the latter being adapted to fit said recess and work therein and form two chambers at the ends thereof, one of said ducts connecting the inlet side of valve to one of said chambers, said duct being disposed to one side of the center line of valve, a second of said ducts connecting said chamber with the outlet side of valve, and being adapted to be closed by the auxiliary valve when said valve is in the open position, a third of said ducts connecting the outlet side of valve with the other of said chambers.

3. A compound valve having in combination, a main valve consisting of a plug having a longitudinal recess and provided with a transverse passage adapted to communicate with the fluid conduit, and walls having ducts therein, an auxiliary valve for controlling said transverse passage comprising a stem and two pistons, the latter being adapted to fit said recess and work therein and form two chambers at the ends thereof, and a spring for holding said auxiliary valve in its open position, one of said ducts connecting the inlet side of valve to one of said chambers, a second of said ducts connecting said chamber with the outlet side of valve, and being adapted to be closed by the auxiliary valve when said valve is in the open position, a third of said ducts connecting the outlet side of valve with the other of said chambers.

4. A compound valve having in combination, a main valve consisting of a plug having a longitudinal recess and provided with a transverse passage adapted to communicate with the fluid conduit, and walls having ducts therein, a cap for holding said main valve to its seat, an auxiliary valve for controlling said transverse passage comprising a stem and two pistons, the latter being adapted to fit said recess and work therein and form two chambers at the ends thereof, and a spring disposed between said cap and auxiliary valve for holding said valve in its open position, a recess in one of said pistons and a recess in said cap, said recesses being adapted to bed and contain said spring, one of said ducts connecting the inlet side of valve to one of said chambers, a second of said ducts connecting said chamber with the outlet side of valve, and being adapted to be closed by the auxiliary valve when said valve is in the open position, a third of said ducts connecting the outlet side of valve with the other of said chambers.

5. A compound valve having in combination, a main valve consisting of a plug having a longitudinal recess and provided with a transverse passage adapted to communicate with the fluid conduit, and walls having ducts therein, a cap for holding said main valve to its seat, an auxiliary valve for controlling said transverse passage comprising a stem and two pistons, the latter being adapted to fit said recess and work therein and form two chambers at the ends thereof, a stop for preventing the auxiliary valve closing the chamber remote from said cap, a spring disposed between said cap and auxiliary valve for holding said valve in its open position, a recess in one of said pistons and a recess in said cap, said recesses being adapted to bed and contain said spring, one of said ducts connecting the inlet side of valve to one of said chambers, a second of said ducts connecting said chamber with the outlet side of valve, and being adapted to be closed by the auxiliary valve when said valve is in the open position, a third of said ducts connecting the outlet side of valve with the other of said chambers.

6. A compound valve having in combination, a main valve consisting of a plug having a longitudinal recess and provided with a transverse passage adapted to communicate with the fluid conduit, and walls having ducts therein, a cap for holding said main valve to its seat, an auxiliary valve for controlling said transverse passage comprising a stem and two pistons, the latter being adapted to fit said recess and work therein and form two chambers at the ends thereof, a stop for preventing the auxiliary valve closing the chamber remote from this cap, a spring disposed between said cap and auxiliary valve for holding said valve in its open position, a recess in one of said pistons and a recess in said cap, said recesses being adapted to bed and contain said spring, one of said ducts connecting the inlet side of valve to one of said chambers, said duct being disposed to one side of the center line of valve, a second of said ducts connecting said chamber with the outlet side of valve, and being adapted to be closed by the auxiliary valve when said valve is in the open position, a third of said ducts connecting the outlet side of valve with the other of said chambers.

7. A compound valve having in combination, a main valve consisting of a plug having a longitudinal recess and provided with a plurality of transverse passages adapted to communicate with the fluid conduit, and walls having ducts therein, and an auxiliary valve for controlling said transverse passages comprising a stem and a plurality of pistons, the latter being adapted to fit said recess and work therein and form two chambers at the ends thereof, and a stop for preventing the auxiliary valve closing the inner of said chambers, one of said ducts connecting the inlet side of valve to one of said chambers, a second of said ducts connecting said chamber with the outlet side of valve, and being adapted to be closed by the auxiliary valve when said valve is in the open position, a third of said ducts connecting the outlet side of valve with the other of said chambers.

Dated this 15th day of January 1912.

ALEXANDER PURSER.

Witnesses:
C. B. HENDERSON,
B. PULLIN.